United States Patent Office 2,940,334
Patented June 14, 1960

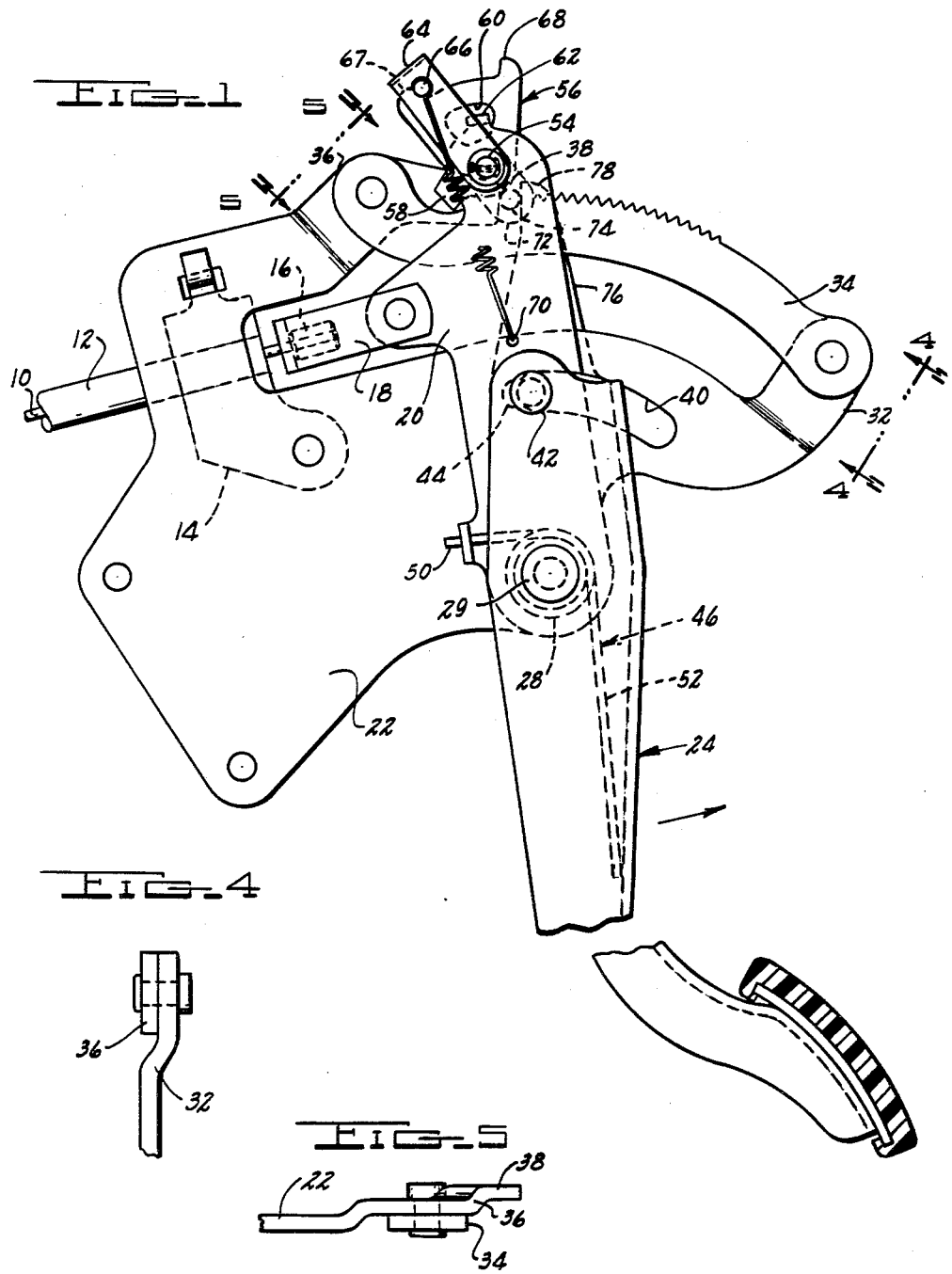

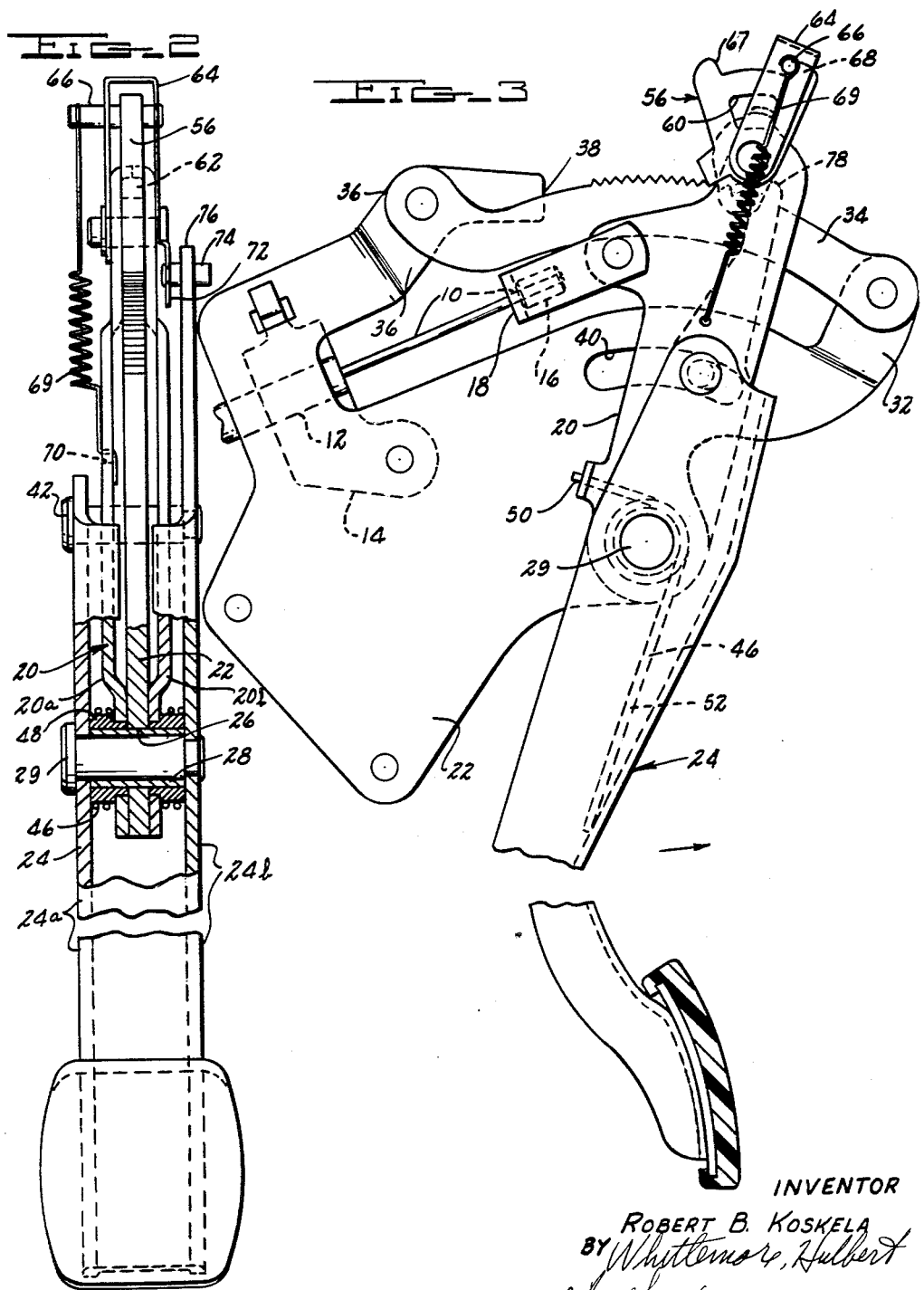

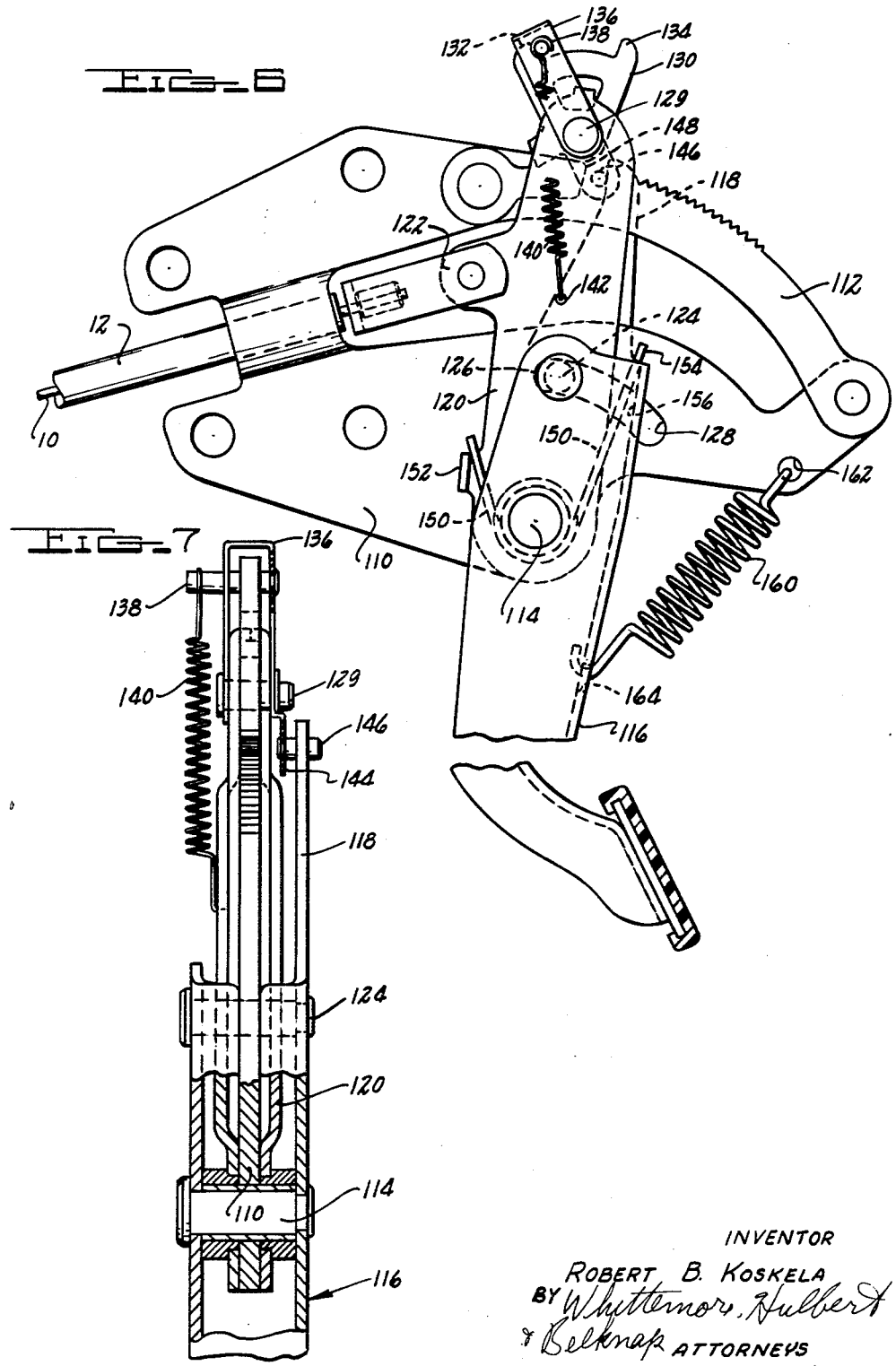

2,940,334

PARKING BRAKE

Robert B. Koskela, Pontiac, Mich., assignor to American Forging and Socket Company, Pontiac, Mich., a corporation of Michigan Filed Aug. 27, 1956, Ser. No. 606,359

18 Claims. (Cl. 74—539)

The present invention relates to a parking brake.

It is an object of the present invention to provide a pedal actuated parking brake including means for latching the brake and operating pedal in brake latching position, said means being releasable as a result of the application of pressure to the brake pedal to permit controlled release of the brake.

More specifically, it is an object of the present invention to provide a pedal operated parking brake comprising a pair of levers pivoted together having means providing for limited lost motion between said members, and ratchet mechanism controlled in part by relative movement between said levers operable to latch the brake in applied position and to release the brake by the simple application of pressure to the braking pedal followed by controlled movement of the pedal to brake released position.

Other objects and features of the invention will become apparent as the description proceeds, especially when taken in conjunction with the accompanying drawing, wherein:

Figure 1 is a side elevational view of the brake mechanism.

Figure 2 is a front elevational view of the brake mechanism with parts broken away.

Figure 3 is a fragmentary view showing the ratchet mechanism in the position which it occupies with the brake applied.

Figure 4 is a fragmentary elevational view looking in the direction of the arrows 4—4, Figure 1.

Figure 5 is a fragmentary elevational view looking in the direction of the arrows 5—5, Figure 1.

Figure 6 is a side elevational view of a modified construction.

Figure 7 is a fragmentary front elevational view of the construction shown in Figure 6, with parts broken away.

The particular brake system to which the actuating mechanism is connected may be of any convenient type. According to the present invention the system is shown as actuated by a flexible cable 10 received in a supporting conduit 12, the conduit being engaged by a clamp 14 and the cable being connected as indicated at 16 to a link 18 connected to the brake applying lever 20.

The brake actuating mechanism comprises a stationary supporting plate or bracket 22 adapted to be supported generally in front of the dash of a vehicle so as to support a brake pedal 24 in depending relation. The bracket 22 is provided with a pivot opening 26 receiving a spacer 28 which with the pivot pin 29 provides a stationary pivot for the pedal 24 as well as with motion transmitting or brake applying lever 20 composed of two plates 20a and 20b disposed at opposite sides of the bracket 22.

The bracket 22 at its rearward end includes a laterally offset ear 32 to which is connected the rearward end of a curved ratchet plate 34. The bracket 22 as best seen in Figure 5, includes a second laterally offset ear 36 to which the other end of the ratchet plate 34 is connected. The ears 32 and 36 are offset to locate the ratchet plate 34 in the plane of the bracket 22. The ear 36 includes a further offset extension 38 constituting a stop member whose purpose will subsequently be described. The bracket 22 is further provided with an elongated slot 40.

The pedal 24 is formed of a metal stamping having a portion 24a at one side thereof and a portion 24b at the other side thereof. The pedal 24 extends substantially above the axis of the pivot pin 29 and is there provided with a transverse pin 42 which is received in a short arcuate slot 44 formed in the lever 20. The pin 42 is permitted freedom to travel in the elongated arcuate slot 40 in the bracket 22.

A relatively strong coil spring 46 is provided which is coiled around bushings 48. One end of the spring as indicated at 50, extends through an opening in a lug formed on the lever 20. The other end of the spring as indicated at 52, bears against the pedal 24 and tends to rock it counterclockwise as seen in Figure 1, or in a direction corresponding to brake releasing movement of the pedal.

At its upper end the lever 20 carries a pivot pin 54 on which is mounted a movable pawl 56. The pawl 56 has a tooth engaging point 58 and is provided with an opening 60 which receives bent over fingers 62 of the lever 20 to limit rocking movement of the pawl. Also mounted on the pivot pin 54 is a pawl control lever 64 carrying a pin 66 engageable between ears 67 and 68 of the pawl. The pin 66 of the pawl control lever 64 is connected by a tension spring 69 to the lever 20, one end of the coil spring extending through an opening 70 in the lever. The location of the opening 70 is such that the lever 64 is an over-center device adapted to bias the pawl 56 toward either latching or release position. The latch control lever 64 has at one side a depending extension 72 carrying a pin 74 by means of which the pawl control lever may be swung to either pawl latching or pawl releasing position.

Means are provided on the pedal for effecting swinging movement of the pawl control lever under certain conditions. For this purpose the side portion 24b of the pedal includes an extension 76 having a finger portion 78 engageable with the pin 74 under conditions to be described below.

With the parts in the position shown in Figure 1 the mechanism is in the brake release position. It is assumed that the brake system includes the usual springs applying tension to the cable 10 so that forces are available constantly urging the lever 20 in a counterclockwise direction about pivot pin 29. In the position shown the pin 74 is engaged against the end of the stop 38 and the forces available in the brake system will have rocked the pawl control lever 64 to the position shown. At this time tension of the spring 69 acting between the lever 64 and the opening 70 applies a counterclockwise force to the lever 64 as seen in Figure 1, and this in turn applies a similar counterclockwise bias to the pawl 56. Thus, the pawl is biased to the latching position. At this time the spring 46 tends to rock the pedal 24 in a counterclockwise direction about the axis of pivot pin 29 but this movement is prevented by engagement between pin 42 and the end of slot 40 in bracket 22. Thus, the pin 42 remains at the right hand end of the slot 44, as lever 20 is pulled to the front or in a counterclockwise direction by tension in the cable 10.

If the operator now applies pressure to the pedal 24, the pedal will move in a clockwise direction and the lever 20 will follow without lost motion, since the pin 42 is already at the right hand end of the slot 44 with the parts in the position shown in Figure 1. This movement of the lever 20 is permitted, the point of the pawl moving yieldably over the teeth of the ratchet. When braking pressure is released from the lever 20, the spring in the braking system will initiate counterclockwise rotation of the lever 20 and the point of the pawl 58 will drop into the appropriate tooth space of the ratchet. When pawl 58 holds lever 20, the spring 46 is effective to rock the pedal 24 counterclockwise a limited amount relative to lever 20 as permitted by the short slot 44 in lever 20. This causes the finger 78 to swing the pin 74 clockwise about pivot pin 54 as seen in Figure 3 and hence, to move the pawl control lever 64 over-center to a position in which its pin 66 engages the ear 68 of the pawl. This is accomplished without actual disengagement of pawl 58 from the tooth of ratchet 34 since the tension spring 69 is relatively weak and since the pawl is retained in latched relation by the pull of the brake actuating cable 10. The pawl remains engaged with the ratchet, but is lightly biased toward release position, so that the system is prepared for release of the pawl from the ratchet upon the next subsequent application of pressure to the pedal. The parts at this time are in the position illustrated in Figure 3.

When the operator desires to release the brake he first applies pressure to the pedal. The initial effect of this is to move the pin 42 to the right hand end of the slot 44 as seen in Figure 1, against the force of the spring 46. This force is substantial so that when the brake pedal unlatches, the operator's foot is applying sufficient pressure to the pedal to prevent sudden movement of the pedal. When the pressure applied to the pedal 24 is sufficient to release the pawl, the pawl swings to ratchet clearing position. The operator may now permit the pedal to move against the pressure applied by his foot to release the brake. As the brake is fully released, the parts again approach the position illustrated in Figure 1. At this time the pin 74 engages the stop 38 and the latch control lever 64 is again swung to the position in which it biases the pawl toward latching position.

From the foregoing detailed description it will be observed that as the lever 20 is moving clockwise as the operator applies pressure to the brake pedal, the pawl member 56 is biased counterclockwise or in latching direction so that its pawl point or tooth 58 clicks over the teeth of the ratchet. When the proper pressure is applied to the brake, the operator releases the pedal and the pedal 24 and lever 20 rotate counterclockwise for a limited distance as determined by engagement of the pawl point 58 with a tooth of the ratchet. This immediately stops release movement of the lever 20. However, the pedal 24 can have a slight additional movement as its pin 42 may move in the short slot 44 in the lever 20. This relative movement of the pedal 24 causes its extension 78 to engage the pin 72 of the pawl control lever 64, thus swinging it clockwise to the position shown in Figure 3, at which time it operates to bias the pawl 56 toward release position. The pawl however is prevented from moving to release position by engagement between its point 58 and a tooth of the ratchet. However, when pressure is next applied to the pedal so as to release the pawl 56 from engagement with the ratchet, the over-center spring 69 will swing the pawl to release position. Then, as pressure on the pedal is released to release the brakes, the pedal 24 and lever 20 swings counterclockwise until they reach the limiting position. Upon approaching the limiting position the pin 74 of the pawl control lever 64 engages the end of the extension 38, thus swinging the pawl control member 64 counterclockwise to the position in which it biases the pawl 56 toward latching engagement.

Thus, as the lever 20 is moving clockwise to apply the brakes, the pawl control member 64 is to the left applying a latching bias to the pawl 56. After the pawl is engaged the spring 46 acting on the pedal 24 causes its extension 78 to swing the pawl control member 64 to a position in which it biases the pawl toward release position. As the lever 20 moves counterclockwise to release the brakes, the pawl is biased to the release position until the lever 20 reaches its limiting position, and during the last part of this movement the pawl control lever 64 is swung toward the position in which it biases the pawl toward latching position so that it may be operative upon the next application of the brakes.

In the embodiment of the invention as thus far described it is assumed that the brake system to which the system of levers is connected, is designed at all times to apply tension to the cable 10. However, in some instances the brake system is so designed that when the parking brake is in its off position there is little or no tension applied to the cable 10. In this case the mechanism illustrated in Figures 6 and 7 is employed.

In this embodiment of the invention there is provided a support bracket 110 having a hardened ratchet member 112 connected thereto. Pivotally connected to the frame 110 by a pivot pin 114 is a first lever comprising a pedal portion 116 and an upwardly extending latch control finger 118. Also pivotally connected to the bracket by the pin 114 is the brake applying lever 120 having an apertured projection 122 for connection to a brake applying cable such as the cable 10 shown in Figure 1. A limited lost motion connection is provided between the pedal 116 and the brake applying lever 120 and this means comprises a pin 124 carried by the pedal 116 and extending through a short elongated slot 126 in the brake applying pedal. A much longer elongated slot 128 is provided in the bracket 110 to permit movement of the pedal 116 and brake applying lever 120 substantially as a unit.

Pivotally connected to the upper end of the brake applying lever 120 by a pin 129 is a pawl 130 having ears 132 and 134. Also pivotally connected to the upper end of the lever 120 by the pin 129 is a U-shaped pawl control lever 136 carrying a pin 138 engageable alternately with the ear 132 or 134. A light tension spring 140 connects the pin 138 to an opening 142 in the lever 120. The location of the points of connection of the spring 140 are such that it serves as an over-center spring effective to bias the pawl control lever 136 either to the right or left as seen in Figure 6. In the position shown in Figure 6 the pawl control lever 136 biases the pawl 130 toward latching position.

One leg of the U-shaped pawl control lever 136 has an extension 144 carrying a pin 146 engageable by the latch control finger 118 or by a projection 148 formed on the bracket 110.

In this embodiment of the invention a coil torsion spring 150 is provided surrounding the pivot pin 114 and having one end engaging against a transversely bent lug 152 on the lever 120. The other end of the spring, as indicated at 154, extends upwardly from the pivot pin 114 and engages a web portion 156 of the pedal 116. It will be observed that the torsion spring 150 is in effect inverted with respect to the torsion spring 46 shown in Figure 1. In addition, a relatively strong extension spring 160 is provided which extends from an opening 162 provided in the bracket 110 and an opening 164 in the pedal. With this arrangement it will be observed that the torsion spring 150 operates between the pedal 116 and the lever 120 and biases the lever 120 counterclockwise and the pedal 116 clockwise as seen in Figure 6. At the same time, the tension spring 160 biases the pedal 116 counterclockwise as seen in Figure 6.

With this arrangement, and assuming the tension applied to the lever 120 by the brake system is negligible, the conditions illustrated in Figure 6 exist as the parking brake starts to move toward its applied position. At this time the spring 150 is effective to have rocked the lever 120 to the illustrated position and to hold it in this position with the pin 124 engaged against the right hand end of the elongated slot 126. It will be observed that the pin 146 will have engaged the end of the abutment 148 and will have been rotated counterclockwise to an over-center position in which a counterclockwise bias is applied to the pawl 130. With the parts in this position, the next operation is the continued application of the parking brake which is accomplished by swinging the pedal clockwise from the position illustrated. Initial movement of the pedal causes equal movement of the brake applying lever 120 and a corresponding take-up on the cable connected to the apertured projection 122. When the desired application of braking pressure is in effect, the pedal is released. At this time the pawl control lever 136 continues to bias the pawl 130 in latching direction and accordingly the tooth of the pawl will engage a tooth of the ratchet member 112 and will retain the brake in applied position.

Release of the brake applying pedal 116 upon the next forward movement of the pedal is prepared by limited counterclockwise movement of the pedal relative to the latched brake applying lever 120 as a result of the tension of the spring 160. This relative movement causes the upwardly extending finger 118 of the pedal to engage the pin 146 and to swing the pawl control lever 136 in a clockwise direction over-center so that its pin 138 engages the ear 134 of the pawl. There is thus established a force tending to release the pawl from the ratchet. However, the relatively light spring 140 is ineffective to release the pawl and in fact the pawl cannot be released by the spring until substantially full brake applying pressure is again applied to the pedal. When this is done however, the pawl 130 snaps to unlatched position and permits release of the brakes accompanied by counterclockwise movement of the pedal 116 to a position in which the pin 146 encounters the abutment 148 and again snaps the pawl control lever 136 over-center to the position illustrated in Figure 6.

The drawings and the foregoing specification constitute a description of the improved parking brake in such full, clear, concise and exact terms as to enable any person skilled in the art to practice the invention, the scope of which is indicated by the appended claims.

What I claim as my invention is:

1. Brake actuating mechanism comprising a fixed mounting bracket having pivot means thereon, a ratchet surface concentric with said pivot means, and a stop adjacent one end of said ratchet surface, a first lever pivotally connected to said plate by said pivot means and having an actuating finger at one end adjacent said ratchet surface, a second lever pivotally connected to said plate by said pivot means and having a connection for a tension member to extend to a brake system, a ratchet engaging pawl pivoted to said second lever, an over-center pawl control lever pivoted to said second lever having a pawl engaging portion adapted to bias said pawl toward latched or unlatched position, an over-center spring connected to said pawl control lever, a lost motion connection between said first and second levers providing for limited relative angular movement therebetween and for actuation of said second lever by said first, an abutment on said pawl control lever engageable by the finger on said first lever, and a spring acting between said first and second levers acting to rock said first lever in brake releasing direction relative to said second lever, said abutment being engageable with said stop upon movement of said first and second levers into brake release position to rock said pawl control lever to bias said pawl toward latched position, said finger being engageable with said abutment to rock said pawl control lever to bias said pawl toward release position when said first lever is released to permit latching engagement of said pawl with said ratchet surface after said first and second levers have been moved to brake applied position.

2. A foot operated parking brake comprising a fixed pivot support having a ratchet surface thereon, a pedal and motion transmitting lever pivoted to said pivot support, a limited lost motion connection between said pedal and lever, means for connecting said lever to a brake system, a pawl carried by said lever, and pawl control means including means carried by said pedal and by said support to bias said pawl toward latching position upon movement of said pedal to brake release position for latching engagement with said ratchet surface upon the next brake applying movement of said pedal and to bias said pawl toward release position when said pedal is released following movement to brake applied position.

3. Mechanism as defined in claim 2 in which said pawl control means includes a spring connected between said pedal and lever and biasing said pedal toward brake release position.

4. Mechanism as defined in claim 3 in which said spring is of such strength as to be overcome by the resistance of the brake system during application of brakes.

5. Brake actuating mechanism comprising a pair of levers pivoted together, limited lost motion means acting between said levers, resilient means acting between said levers, ratchet mechanism operable to retain said levers in brake applying position, means responsive to relative movement between said levers caused by said resilient means as a result of release of brake applied force to said levers in brake applied position to bias said ratchet mechanism for release upon the next application of force to said levers in brake applying direction, and means responsive to movement of said levers to brake release position to bias said ratchet mechanism toward latching position.

6. A parking brake comprising a lever system, a pawl and ratchet latch mechanism for holding said lever system in brake applied position, means responsive to release of brake applying pressure to the lever system in the brake applied position to condition the pawl and ratchet latch mechanism for release upon re-application of pressure in brake applying direction thereto, said means including over-center spring biasing means connected to said pawl and ratchet latch mechanism.

7. A parking brake comprising a lever system, a pawl and ratchet latch mechanism for holding said lever system in brake applied position, means responsive to release of brake applying pressure to the lever system in the brake applied position to condition the pawl and ratchet latch mechanism for release upon re-application of pressure in brake applying direction thereto, and means responsive to movement of said lever system to brake release position to condition said pawl and ratchet latch mechanism for latching engagement upon the next movement of said lever system in brake applying direction, both of said means including over-center spring biasing means connected to said pawl and ratchet latch mechanism.

8. A brake lever, a movable pawl on said brake lever, a fixed ratchet in position to be engaged by said pawl, means responsive to release of brake applying pressure to said lever in brake applied position to bias said pawl toward release position with a force less than sufficient to release the pawl while the brakes are applied but sufficient to release the pawl when braking pressure is next applied to the lever, and means responsive to movement of said lever to brake release position to bias said pawl toward operating position to effect interlocking engagement with said ratchet upon the next succeeding movement of said lever to brake applied position followed by release of braking pressure therefrom.

9. Mechanism as defined in claim 8 in which both of said means includes an over-center spring operably associated with said pawl.

10. Mechanism as defined in claim 8 in which said means includes a pawl biasing lever, an overcenter spring connected thereto operable to bias said pawl biasing lever selectively toward pawl operating position and pawl release position, and abutment means engageable by said pawl biasing lever upon movement of the brake lever to brake release position and to brake applied position followed by release of brake applying pressure.

11. A parking brake comprising a system including a support, an operator actuated member movable on said support between a brake release position and a brake applying zone, latch mechanism comprising pawl and ratchet members connected between said support and said operator actuated member, bias means connected to said mechanism to bias said pawl and ratchet members selectively into relative latching and release positions, means responsive to movement of said operator actuated member into release position effective to actuate said bias means to bias said pawl and ratchet members toward relative latching position, and means rseponsive to release of said operator actuated member by the operator in said brake applying zone to actuate said bias means to bias said pawl and ratchet members toward relative release position, said pawl and ratchet members being shaped to prevent such relative movement to release position until re-application of operator applied pressure to said operator actuated member.

12. A parking brake comprising a system including a support, an operator actuated member movable on said support, a ratchet and pivoted pawl connected between said support and member, shiftable spring means connected to said pawl to bias it selectively toward and away from said ratchet, means responsive to movement of said member to brake release position to shift said spring means to bias said pawl toward said ratchet, and means responsive to release by the operator of said member with the brakes applied to shift said spring means to bias said pawl away from said ratchet, said pawl and ratchet having latching teeth effective to prevent disengagement therebetween until said member is given slight additional movement by the operator to release said member.

13. Brake actuating mechanism comprising a bracket, a brake lever pivoted to said bracket, an operator actuated lever pivoted to said bracket, said brake lever being movable a substantial distance between a brake released position and a brake applied position, a limited lost motion actuating connection between said levers so that said operator actuated lever has a brake released and a brake applied position separated by a corresponding substantial distance, latch mechanism interposed between said bracket and said brake lever, latch control mechanism, means responsive to release of brake applying pressure to said operator actuated lever while in brake applied position to operate said latch control mechanism to effect release of said latch mechanism upon the next application of braking pressure to said operator actuated lever while said operator actuated lever remains in brake applied position.

14. Brake actuating mechanism comprising a bracket, a brake lever pivoted to said bracket, an operator actuated lever pivoted to said bracket, said brake lever being movable a substantial distance between a brake released position and a brake applied position, a limited lost motion actuating connection between said levers so that said operator actuated lever has a brake released and a brake applied position separated by a corresponding substantial distance, latch mechanism interposed between said bracket and said brake lever, latch control mechanism, means responsive to release of brake applying pressure to said operator actuated lever while in brake applied position to operate said latch control mechanism to effect release of said latch mechanism upon the next application of braking pressure to said operator actuated lever while said operator actuated lever remains in brake applied position, and means responsive to movement of said levers to brake released position to operate said latch control mechanism to condition said latch mechanism for latching operation during the next movement of said levers to brake applied position.

15. Brake actuating mechanism comprising a support, a brake applying member movable on said support, an operator actuated member movable on said support, said brake applying member being movable a substantial distance between a brake released position and a brake applied position, a limited lost motion actuating connection between said members so that said operator actuated member has a brake released position and a brake applied position separated by a corresponding substantial distance, latch mechanism interposed between said support and said brake applying member, latch control mechanism, means responsive to release of brake applying pressure to said operator actuated member while in brake applied position to operate said latch control mechanism to effect release of said latch mechanism upon the next application of braking pressure to said operator actuated member while said operator actuated member remains in brake applied position.

16. Brake actuating mechanism comprising a support, a brake applying member movable on said support, an operator actuated member movable on said support, said brake applying member being movable a substantial distance between a brake released position and a brake applied position, a limited lost motion actuating connection between said members so that said operator actuated member has a brake released position and a brake applied position separated by a corresponding substantial distance, latch mechanism interposed between said support and said brake applying member, latch control mechanism, means responsive to release of brake applying pressure to said operator actuated member while in brake applied position to operate said latch control mechanism to effect release of said latch mechanism upon the next application of braking pressure to said operator actuated member while said operator actuated member remains in brake applied position, and means responsive to movement of said members to brake released position to operate said latch control mechanism to condition said latch mechanism for latching operation during the next movement of said members to brake applied position.

17. Brake actuating mechanism comprising a bracket, a brake lever pivoted to said bracket, an operator actuated lever pivoted to said bracket, said brake lever being movable a substantial distance between a brake released position and a brake applied position, a limited lost motion actuating connection between said levers so that said operator actuated lever has a brake released and a brake applied position separated by a corresponding substantial distance, latch mechanism interposed between said bracket and said brake lever, resilient means connected between said levers and normally taking up the limited lost motion therebetween in one direction, movable latch bias means, means carried by said operator actuated lever to move said latch bias means to a position in which it biases said latch means toward inoperative position, said last means being operable upon relative movement between said levers resulting from release of brake applying pressure to said operator actuated lever while in its brake applied position.

18. Brake actuating mechanism comprising a bracket, a brake lever pivoted to said bracket, an operator actuated lever pivoted to said bracket, said brake lever being movable a substantial distance between a brake released position and a brake applied position, a limited lost motion actuating connection between said levers so that said operator actuated lever has a brake released and a brake applied position separated by a corresponding substantial distance, latch mechanism interposed between said bracket and said brake lever, resilient means connected between said levers and normally taking up the limited lost motion therebetween in one direction, movable latch bias means, means carried by said operator actuated lever to move said latch bias means to a position in which it biases said latch means toward inoperative position, said last means being operable upon relative movement between said levers resulting from release of brake applying pressure to said operator actuated lever while in its brake applied position, abutment means engageable to stop said operator actuated lever at its brake released position, said lost motion connection between said levers permitting limited further movement of said brake lever, and an abutment on said bracket engaged by said bias means during such further movement of said brake lever to move said latch bias means to a position in which it biases said latch means toward operative position.

References Cited in the file of this patent

UNITED STATES PATENTS

| | | | |
|---|---|---|---|
| 914,277 | Howe | Mar. 2, | 1909 |
| 1,614,289 | Dominguez | Jan. 11, | 1927 |
| 2,188,281 | Lucker | Jan. 23, | 1940 |
| 2,281,467 | Thorp | Apr. 28, | 1942 |
| 2,308,898 | Skareen | Jan. 19, | 1943 |
| 2,309,454 | Heller | Jan. 26, | 1943 |
| 2,467,557 | Jandus | Apr. 19, | 1949 |
| 2,520,759 | Duma | Aug. 29, | 1950 |
| 2,530,030 | Robertshaw | Nov. 14, | 1950 |
| 2,587,725 | Hinsey | Mar. 4, | 1952 |
| 2,683,382 | Brock | July 13, | 1954 |
| 2,694,945 | Jandus | Nov. 23, | 1954 |
| 2,875,641 | Powell | Mar. 3, | 1959 |
| 2,905,024 | McCarthy | Sept. 22, | 1959 |